United States Patent [19]

Nakayama et al.

[11] Patent Number: 5,773,969
[45] Date of Patent: Jun. 30, 1998

[54] DC-DC CONVERTER CIRCUIT AND INDUCTIVE LOAD DRIVE DEVICE USING DC-DC CONVERTER CIRCUIT

[75] Inventors: Tetsuya Nakayama; Masakazu Moritoki; Masao Hagiwara; Kenichiro Maeda; Daisuke Yoshida, all of Hiratusuka, Japan

[73] Assignee: Komatsu Ltd., Japan

[21] Appl. No.: 564,339

[22] Filed: Feb. 27, 1996

[30] Foreign Application Priority Data

May 12, 1993 [JP] Japan ................................ 5-110776

[51] Int. Cl.[6] ............................................. G05F 5/00
[52] U.S. Cl. .......................... 323/330; 323/301; 363/16
[58] Field of Search ............................. 363/15, 16, 17, 363/20, 21; 323/247, 250, 251, 301, 328, 329, 330

[56] References Cited

U.S. PATENT DOCUMENTS

| 4,809,148 | 2/1989 | Barn .................................... 363/20 |
| 5,600,293 | 2/1997 | Hunter .................................. 363/17 |
| 5,659,461 | 8/1997 | Inou et al. ........................... 363/21 |

FOREIGN PATENT DOCUMENTS

| 51-49584 | 11/1976 | Japan . |
| 54-56129 | 5/1979 | Japan . |
| 54-56130 | 5/1979 | Japan . |
| 57-58986 | 4/1982 | Japan . |
| 57-186979 | 11/1982 | Japan . |
| 60-133617 | 9/1985 | Japan . |
| 60-216797 | 10/1985 | Japan . |
| 61-147799 | 7/1986 | Japan . |
| 62-46915 | 3/1987 | Japan . |
| 62-46916 | 3/1987 | Japan . |
| 1143300 | 10/1989 | Japan . |
| 2219461 | 9/1990 | Japan . |
| 3-40883 | 4/1991 | Japan . |
| 4-259 | 1/1992 | Japan . |
| 6233593 | 8/1994 | Japan . |

*Primary Examiner*—Peter S. Wong
*Assistant Examiner*—Y. J. Han
*Attorney, Agent, or Firm*—Greer, Burns & Crain, Ltd.

[57] ABSTRACT

An inductive load drive device using a DC—DC converter circuit with which a high voltage is obtained by the discharge of electromagnetic energy stored in a coil to a capacitor, in which a bias is applied to the magnetic core of a coil (L) with the use of a permanent magnet (Mg) in the direction opposite to the magnetic flux induced by a current so as to increase the electromagnetic energy stored in the coil (L) and make it possible to perform efficient discharge with a small coil.

30 Claims, 13 Drawing Sheets

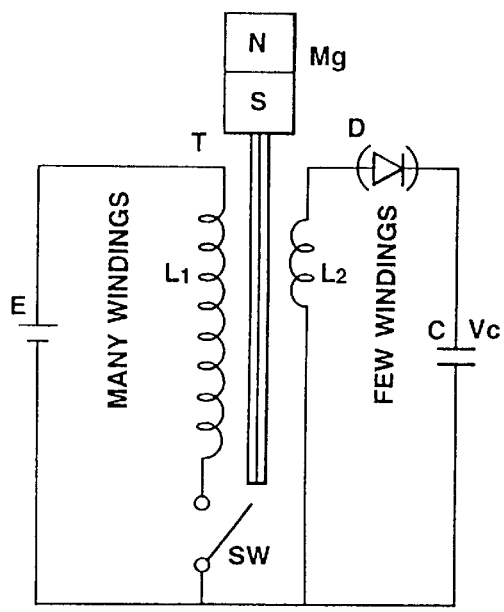
FIG.4(a)
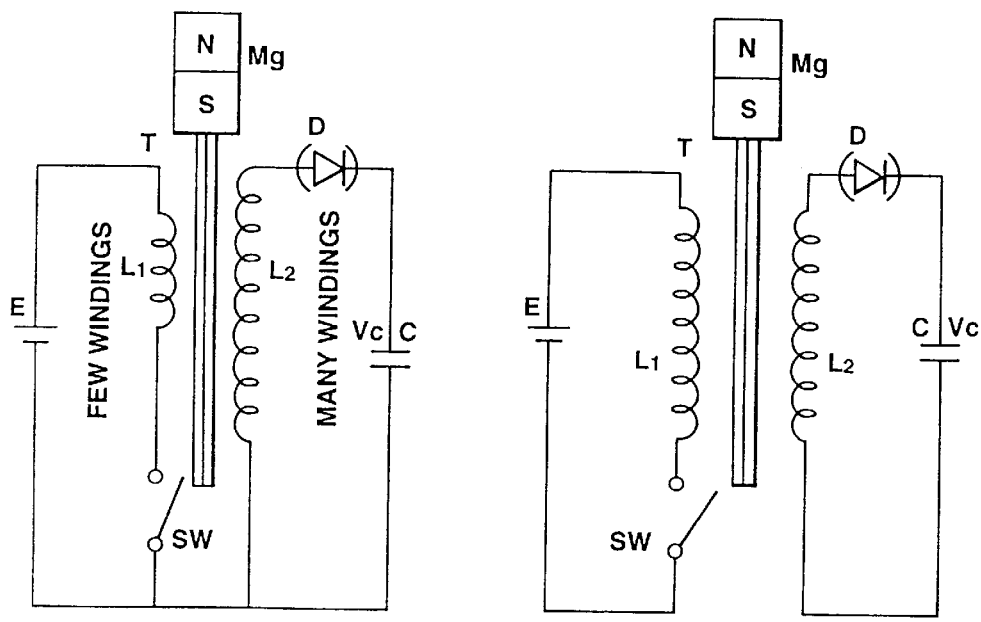
FIG.4(b)   FIG.4(c)

5,773,969

DC-DC CONVERTER CIRCUIT AND INDUCTIVE LOAD DRIVE DEVICE USING DC-DC CONVERTER CIRCUIT

TECHNICAL FIELD

This invention relates to a DC—DC converter circuit and to an inductive load drive device in which this DC—DC converter circuit is used, and more particularly to an inductive load drive device that controls an average current applied to an inductive load by opening and closing a power source applied to an inductive load, and more particularly to an inductive load drive device in which a DC—DC converter circuit is used, and which is used to ensure good rise of a load current by applying an elevated voltage at the start of drive of the inductive load drive device.

BACKGROUND ART

High-speed actuation of a solenoid valve or another such electromagnetic actuator generally requires that an excitation current be raised quickly so that it overpowers an inductance.

If we let an internal resistance of a coil be R and an inductance be L, it is known that the transfer function G (S) of an excitation current I with respect to an applied voltage E is $$G(S)=(1/R)\cdot(1/(1+L\cdot S/R)) \qquad (1)$$

and it is known that, as is clear from the formula, the slope of the rise of the current I immediately after the voltage E has been applied in a state in which I=0 is E/L and the steady-state current is E/R, and that primary lag in the time constant L/R occurs.

Therefore, the applied voltage E must be increased in order to raise the current to a coil of given R and L quickly and thereby achieve fast actuation. However, an increase in the applied voltage E is accompanied by a necessary increase in the steady-state current as well, which tends to lead to heat being generated in the coil, burning, and so on, and the device is also bulkier and wastes more energy. Also, with a machine that makes use of an on-board battery as its power source, such as a moving vehicle, the applied voltage is limited, and sufficient voltage often cannot be obtained.

In order to solve this problem, a voltage elevation circuit (such as a flyback type of DC—DC converter) for raising the applied voltage to the coil and a current control circuit for restricting the steady-state current are provided, a high voltage is applied and the current quickly increased during current rise, and the applied voltage is suppressed and the current prevented from increasing more than necessary by means of the current control circuit when the current reaches a specific value.

FIG. 22 shows an example of a conventional inductive load drive device in which a flyback type of DC—DC converter is used as the voltage elevation circuit. In the figure, 10 is a charger circuit composed of the flyback type of DC—DC converter.

A bulkier apparatus is one of the problems encountered when a flyback type of DC—DC converter is used as a voltage elevation circuit. It was common practice in the past to use a choke coil or a transformer as the inductance of the charger circuit for storing energy, but this resulted in an apparatus that was bulkier and more complicated.

An object of this invention is to solve this problem and provide a DC—DC converter circuit that is relatively compact and lightweight, has a simple circuit structure, and is efficient, and to provide an inductive load drive device in which this DC—DC converter circuit is used.

SUMMARY OF THE INVENTION

This invention is a DC—DC converter circuit provided with a power source, a coil that is connected to the power source, switching means for opening and closing a closed circuit including the power source and the coil, and a capacitor that is connected in parallel to the switching means, wherein the switching means is closed so that the power source voltage will be applied to the coil, which results in energy being stored in the coil, and the switching means is opened at an arbitrarily determined timing, which results in the energy stored in the coil being stored in the capacitor and output, which comprises the electromagnetic energy stored in the coil being increased by the application of a magnetic bias to the magnetic core of the coil in the direction opposite to the direction of the magnetic flux that is induced by the current supplied from the power source.

By thus applying a bias to the magnetic field of the coil and shifting the actuation point, the energy density per unit of surface area of the magnetic core can be increased, and the energy stored in the coil can be increased. Therefore, charging of the capacitor can be carried out efficiently even if a relatively small coil is used, and an inductive load drive device in which a compact and lightweight DC—DC converter circuit is used can be realized.

BRIEF DESCRIPTION OF THE DRAWINGS

FIGS. 4(a) to 4(c) are circuit diagrams of cases in which the number of primary and secondary windings of the second practical example of the present invention are varied;

BEST MODE FOR CARRYING OUT THE INVENTION

Practical examples of the DC—DC converter circuit pertaining to the present invention, and of inductive load drive devices in which this DC—DC converter circuit is used, will be described with reference to the figures.

Figure 1:
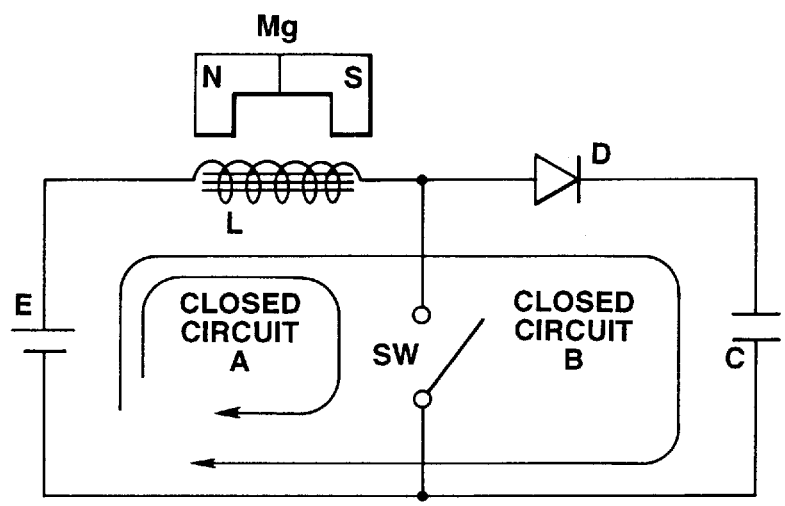
FIG. 1 is a circuit diagram of a first practical example of a DC—DC converter circuit of the present invention, in which a single inductance is used and biased by a permanent magnet.

FIG. 1 shows the first practical example of the DC—DC converter circuit of the present invention.

The operation of this circuit will be described with reference to the figure. A switch Sw is turned on and off at a certain timing. In a closed circuit A composed of a power source E, a coil L, and the switch Sw, when the switch Sw is turned on, the current that flows through the coil L causes energy to store in the coil L.

When the switch Sw is then turned off, the current path shifts to a closed circuit B composed of the power source, the coil L, and a capacitor C, and the instant that the switch Sw is turned off, a high voltage is generated at both ends of the coil L with a diode D side as the high potential side, and the capacitor C begins to be charged through the diode D. The diode D is inserted for the purpose of preventing the short-circuiting of the capacitor C when the switch Sw is then turned on.

As the switch Sw is repeatedly turned on and off, the capacitor C is gradually charged to a high voltage, and more energy is stored in the capacitor C.

In this practical example, a bias is applied by means of a permanent magnet Mg to the magnetic core of the coil L that is used to charge this capacitor C in the direction opposite to the direction of the magnetic flux generated by the passage of current, which shifts the actuation point of the B-H curve and allows more energy to be stored.

Figure 2C:
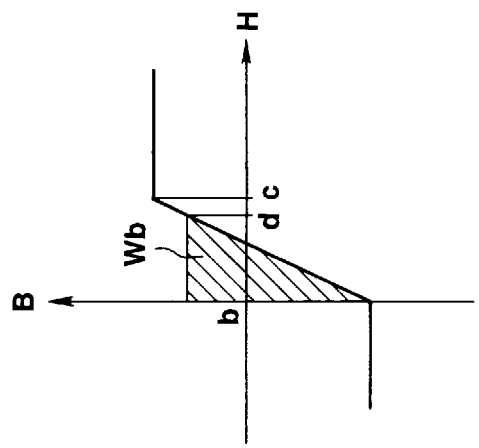
FIGS. 2(a) to 2(c) are diagrams of the energy density being increased by the application of a bias to the magnetic core.
Figure 2B:
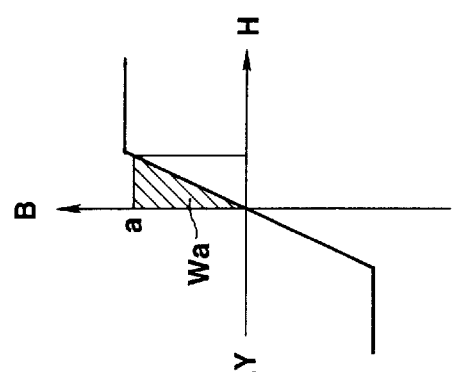
Figure 2A:
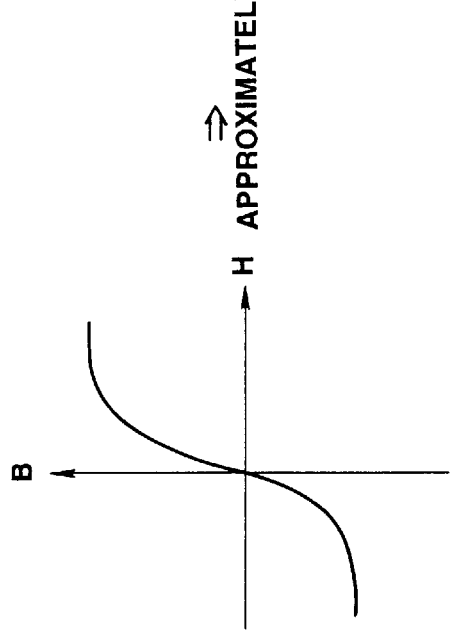

This principle is illustrated in FIG. 2. FIG. 2($a$) shows a typical B-H curve of a coil. For the sake of simplicity, this will be described in model form as in FIG. 2($b$). When the flow of current at this time has raised the flux density to point a, the energy stored in the coil is the Wa portion indicated by the hatching. If a bias is applied to this coil and the actuation point is shifted, then more energy can be stored, as shown by the hatched portion in FIG. 2($c$).

The method adopted in this practical example to shift the actuation point is to apply a bias to the magnetic core of the coil L through the use of the permanent magnet Mg. As a result, the energy density per unit of surface area of the magnetic core is raised, and the coil L that is used to charge the capacitor C can be more compact and lightweight while the same amount of energy is still obtained. If a coil of the same size is used, then more energy can be obtained with a single switching.

Figure 3:
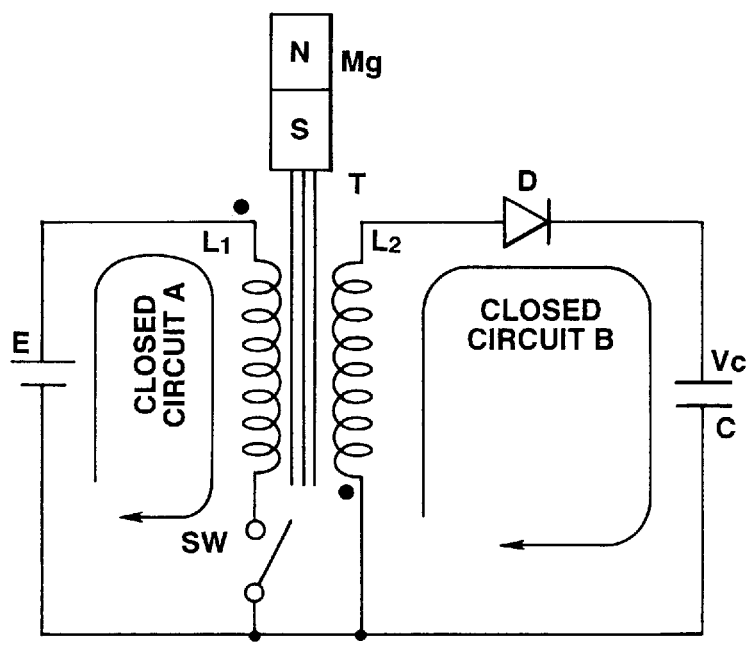
FIG. 3 is a circuit diagram of a second practical example of the DC—DC converter circuit of the present invention, in which a compound transformer is used biased by a permanent magnet.

FIG. 3 shows the circuit in the second practical example of the DC—DC converter circuit of the present invention.

This practical example is basically the same in principle as the first practical example, but a compound transformer T is used instead of the single inductance used in the first practical example. A bias is also applied to this transformer T by means of a permanent magnet Mg in the direction opposite to the direction of the magnetic flux generated by the passage of current in order to raise the energy density per unit of surface area of the magnetic core. As a result, a charger of equivalent performance can be obtained by using a smaller transformer, and the charger section will also be more compact and lightweight.

The operation of this circuit will be described in reference to FIG. 3.

The switch Sw is closed to form the closed circuit A. At this time, since a diode D is provided in the closed circuit B of the secondary side and thus a current flow due to the voltage induced in the secondary coil $L_2$ is impeded, the energy supplied by the power source is stored in the coil $L_1$ on the primary side of the compound transformer T. When the switch Sw is opened, the energy stored in the primary side coil $L_1$ is transferred to the secondary side coil $L_2$, and current flows into the closed circuit B and charges the capacitor C. This repeated opening and closing operation of the switch Sw allows more energy to be stored in the capacitor C.

The circuit in this practical example has the following advantages.

1) Impedance can be changed on the primary and secondary sides.

Specifically, the impedance on the secondary side can be lowered if the number of windings on the primary side of the transformer T is increased and the number of windings on the secondary side is decreased, as shown in FIG. 4($a$).

Also, the impedance on the secondary side can be raised if the number of windings on the primary side is decreased and the number of windings on the secondary side is increased, as shown in FIG. 4($b$). This allows the capacitor C provided to the secondary side to be charged at a higher voltage. In this case, if we let the charging voltage of the capacitor C be Vc and the winding ratio of the transformer be $r=n_2/n_1$ ($n_1$ and $n_2$ are the number of windings of the primary side coil $L_1$ and the secondary side coil $L_2$, respectively), then the withstand voltage of the switch Sw can be lowered to Vc/r.

2) Electrical isolation between the primary side and the secondary side is possible.

Specifically, the primary side can be set up separately from the secondary side and electrical isolation achieved, as shown in FIG. 4(c).

Figure 5:
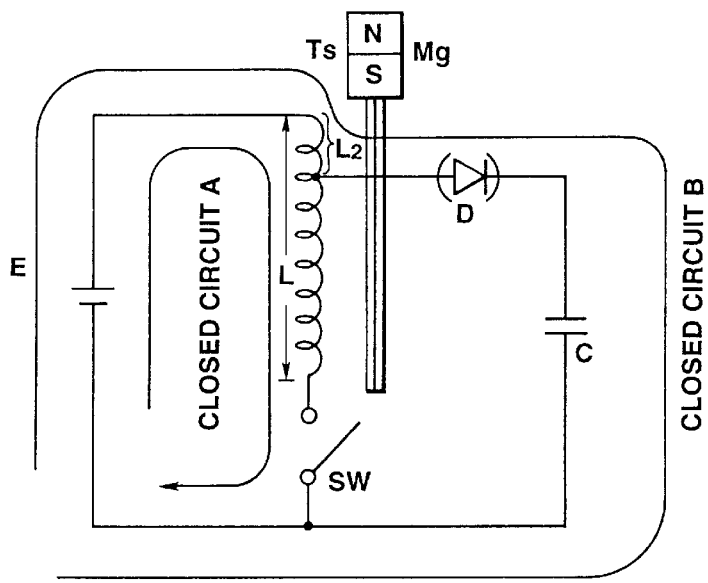
FIG. 5 is a circuit diagram of a third practical example of the DC—DC converter circuit of the present invention, in which an autotransformer is used and biased by a permanent magnet.

FIG. 5 shows the circuit in the third practical example of the DC—DC converter circuit of the present invention.

This practical example is basically the same in principle as the first and second practical examples, but an autotransformer Ts is used instead of the single inductance used in the first practical example. A bias is applied to this transformer Ts by means of a permanent magnet Mg in the direction opposite to the direction of the magnetic flux generated by the passage of current in order to raise the energy density per unit of surface area of the magnetic core. As a result, a charger of equivalent performance can be obtained by using a smaller transformer, and the charger component will also be more compact and lightweight.

The operation of this circuit will be described in reference to FIG. 5.

The switch Sw is closed to form the closed circuit A. The energy supplied by the power source E is stored in the coil L of the autotransformer Ts. When the switch Sw is opened, the closed circuit B is formed and the energy stored in the coil L is transferred to the portion $L_2$ of the coil, and current flows into the closed circuit B and charges the capacitor C. This repeated opening and closing operation of the switch Sw allows more energy to be stored in the of capacitor C.

Figure 6A:
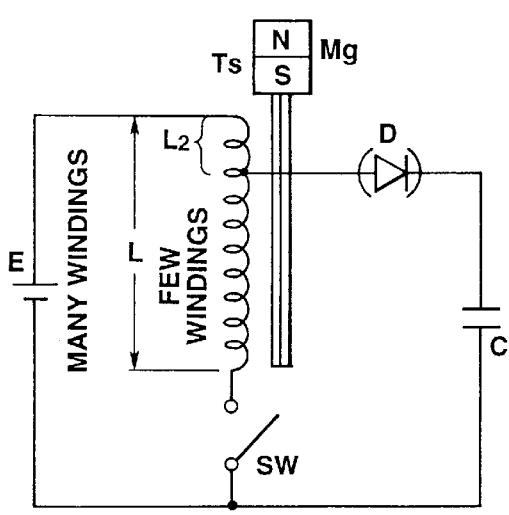
FIGS. 6(a) and 6(b) are circuit diagrams of a case in which the number of primary and secondary windings in the third practical example of the present invention is varied.
Figure 6B:
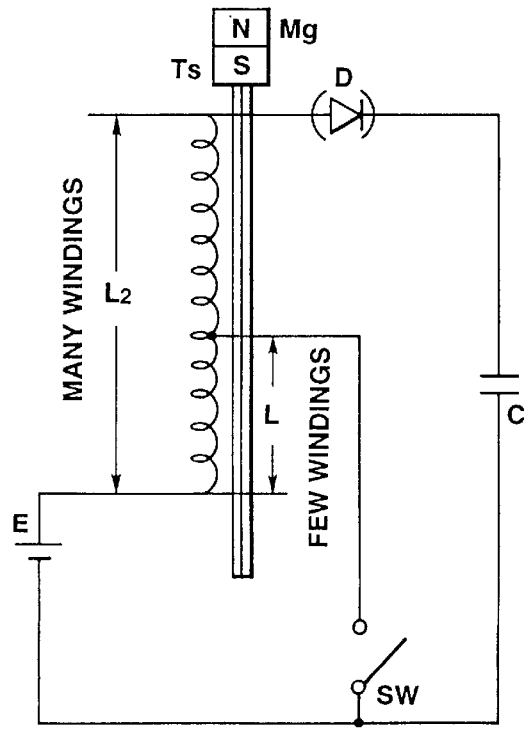

The advantage with this circuit, as shown in FIG. 6, is that the impedance can be changed on the primary and secondary sides, just as with the circuit in the second practical example.

Figure 7C:
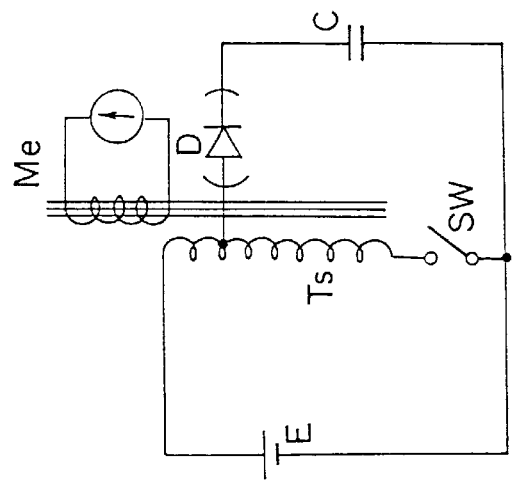
FIGS. 7(a) to 7(c) are circuit diagrams of a fourth practical example of the DC—DC converter circuit of the present invention and modification examples thereof, in which a bias is created with an electromagnet.
Figure 7B:
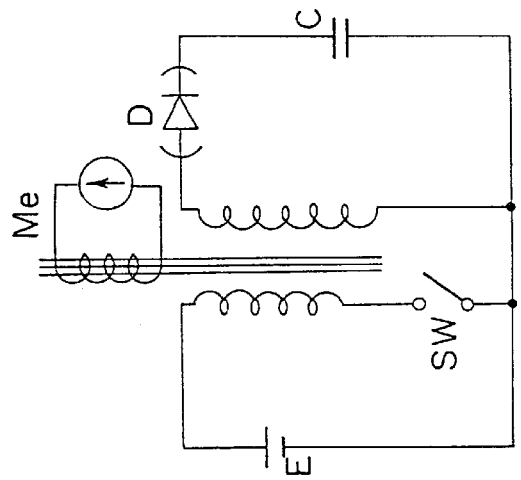
Figure 7A:
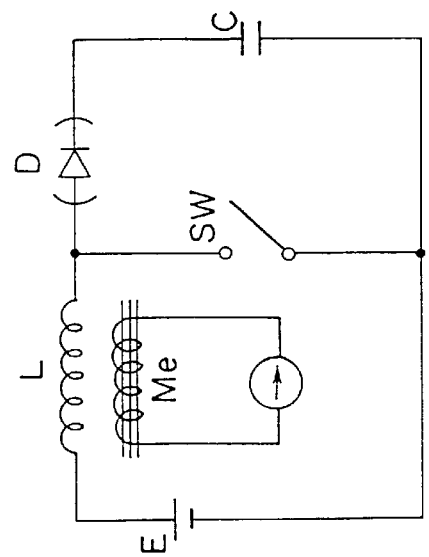

The permanent magnet Mg was used as the method for applying the bias in the first, second, and third practical examples, but it is clear that the same effect will be seen if an electromagnetic Me is used instead. An example of this is shown in FIG. 7. FIG. 7(a) is an example of using a single inductance, FIG. 7(b) of a compound transformer, and FIG. 7(c) of an autotransformer.

Figure 8:
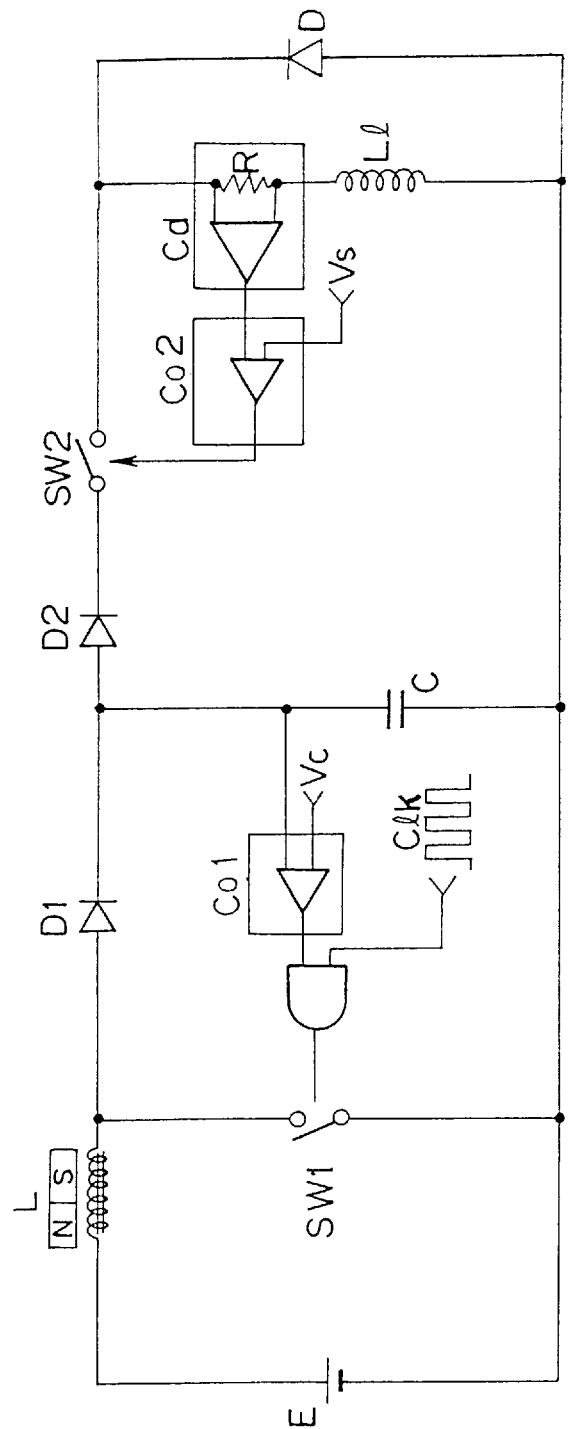
FIG. 8 is a circuit diagram of a practical example of an inductive load drive device in which the DC—DC converter circuit of the present invention is used.

FIG. 8 shows a practical example of the inductive load device of the present invention in which the DC—DC converter shown in the above first through fourth practical examples is used.

In FIG. 8, a comparator Co1 is used to manage the charging voltage of the capacitor C. The comparator Co1 compares the terminal voltage of the capacitor C with a reference voltage Vc, and if the voltage of the capacitor C is lower than the reference voltage Vc, an interrupt signal C1 is input to the switch Sw1 to open and close the switch Sw1, and the energy of the coil L is charged into the capacitor C. At the start of drive, when current flows to the inductive load L1, the switch Sw2 is closed and the voltage that has been charged into the capacitor C is used as the drive commencement voltage. A structure such as this allows an improvement in the rise of the current that flows to the inductive load L1.

A comparator can also be used to manage the value I of the current that flows to the inductive load L1. For example, a resistor R is inserted serially in the inductive load L1, current detection means Cd for detecting the voltage at both ends of the resistor R, for example, is provided, and a comparator Co2 compares the detected value with a reference value Vs and determines the current value I. If the current value I is greater than the reference value, the switch Sw2 is opened, and if it is less than the reference value, the switch Sw2 is closed. Repetition of this operation allows the current that flows to the inductive load L1 to be controlled. A circuit that controls the opening and closing of a switch based on an evaluation of the conditions is hereinafter called a switch control circuit Chp.

Figure 9:
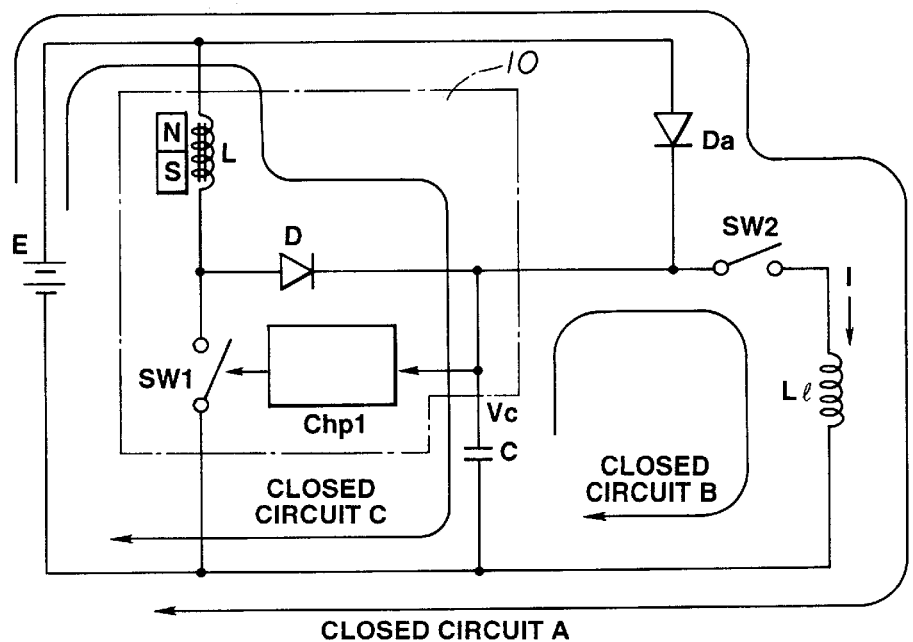
FIG. 9 is a circuit diagram of another practical example of the inductive load drive device of the present invention.

FIG. 9 shows another practical example of the inductive load device of the present invention.

In FIG. 9, this circuit comprises a first closed circuit A capable of supplying current from a battery or another such power source E directly to an inductive load L1, a capacitor C whose negative side terminal is grounded, a charger circuit 10 with which this capacitor C can be charged from a battery or another such power source E with a specific voltage Vc that is higher than the power source voltage E, a second closed circuit C that includes the capacitor C and the charger circuit 10, a third closed circuit B capable of supplying current from the capacitor C to the inductive load L, and a switch Sw2 with which the first closed circuit A and the third closed circuit B can be opened and closed.

The switch Sw2 is turned on and off in the following sequence at a timing controlled by a control means.

First, the switch Sw2 is turned off when no current flows to the inductive load L1. With the closed circuit C, the action of the charger circuit 10 results in the capacitor C being charged with the specific voltage Vc. In the figure, the charger circuit 10 is depicted as the one in Practical Example 1, but the charger circuit is not limited to this.

Next, the switch Sw2 is closed at the point when the excitation current I begins to flow, when it is desirable for the excitation current I to the inductive load L1 to rise quickly. As a result, the voltage Vc at both ends of the capacitor C is applied to the inductive load L1, and the charge stored in the capacitor C causes the excitation current I to go up rapidly.

When the switch Sw2 is closed and the charge stored in the capacitor C flows to the inductive load L1, there is a reduction in the voltage of the capacitor C. When the voltage Vc of the capacitor C becomes equal to the power source voltage E, the diode Da is turned on, the closed circuit A works, the power source voltage E is directly applied to the inductive load L1 through the diode Da, and the current flowing to the inductive load L1 is maintained. Therefore, there is no further reduction in the voltage of the capacitor C.

Repetition of this series of operations allows the inductive load L1 to be driven at high speed, and allows the time lag to be eliminated from the current rise time.

The control of the current I flowing to the inductive load L1 can also be accomplished by opening and closing the switch Sw2 with a combination of the same detection means Cd and switch control circuit Chp as in the example in FIG. 8.

Figure 10:
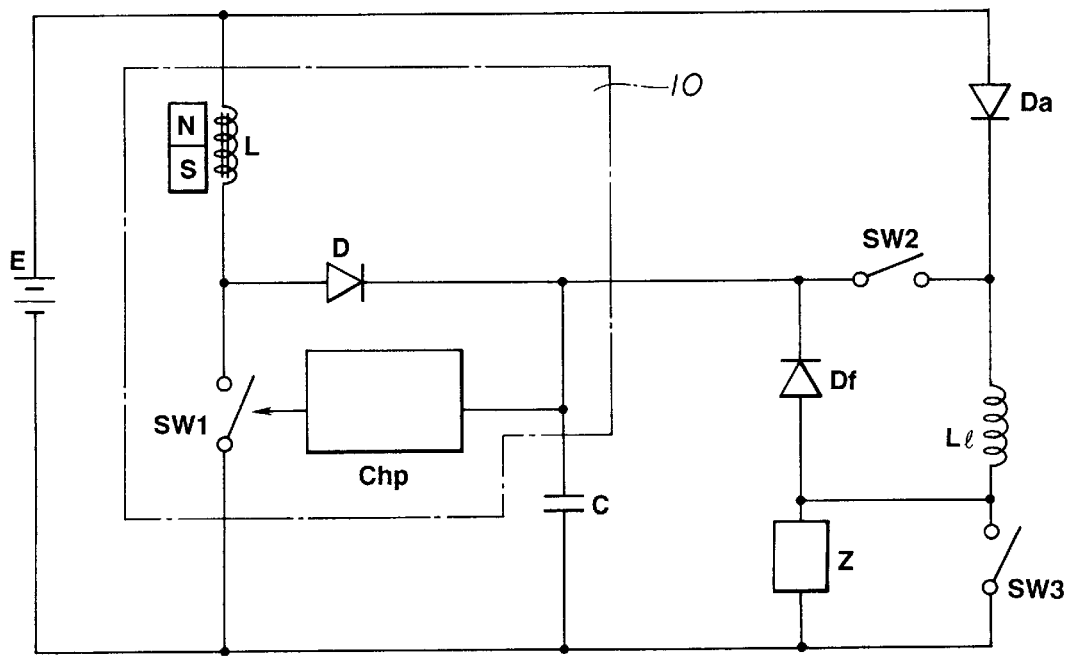
FIG. 10 is a circuit diagram of yet another practical example of the inductive load drive device of the present invention.

FIG. 10 shows yet another practical example of the inductive load drive device of the present invention. The inductive load drive device in this practical example has a switch Sw3 provided in addition to the switch Sw2 in the practical example in FIG. 9. The switch Sw3 is placed between the inductive load L1 and the GND, and a diode Df is provided between the switch Sw3 and the capacitor C that is used for charging from the connection point of the inductive load L1 and the switch Sw3, thus creating a circulating path.

With this circuit, the switch Sw2 and the switch Sw3 are turned on simultaneously during current rise. In order to control the current I flowing to the load L1 to the set value, the switch Sw3 is turned off when the current I is greater than the set value, and is turned on when the current I is smaller, so that the current value conforms to the set value. After the period in which the load L1 is driven is finished, the switch Sw2 and the switch Sw3 are turned off simultaneously. At this time the energy of the current I flowing through the load L1 can be circulated through the diode Df to charge the capacitor C, which allows the power consumption to be reduced and the overall efficiency increased.

Z in the figure is a voltage control means that is used when excess voltage is applied to the switch Sw3.

Figure 11:
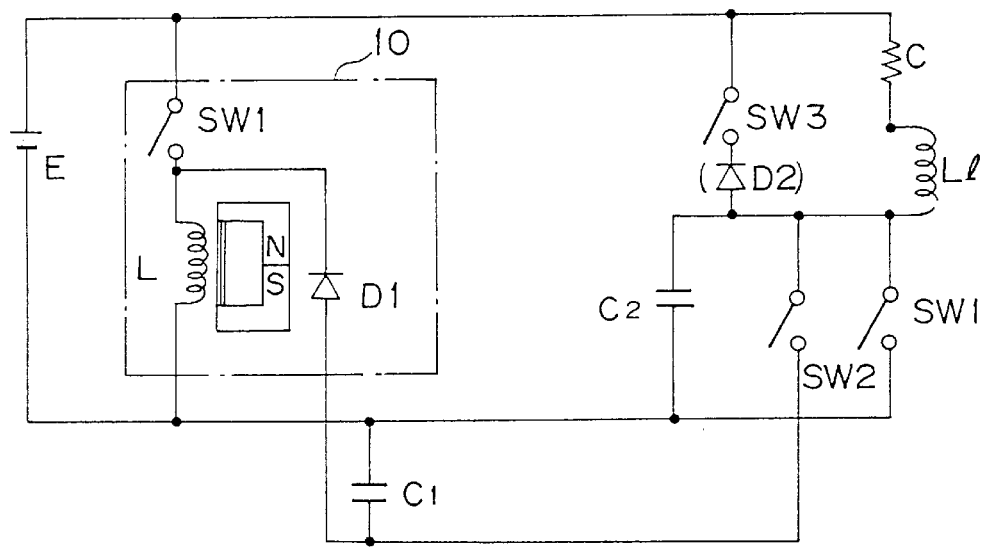
FIG. 11 is a circuit diagram of yet another practical example of the inductive load drive device of the present invention.

FIG. 11 shows yet another practical example, in which a regenerative pumping capacitor is provided to a circuit in which the energy of the current I flowing through the load L1 is circulated.

The operation here will be described in reference to FIG. 11. The capacitor C1 is charged at a high negative voltage with respect to the GND by a charger circuit. The switch Sw3 is the switch that makes up the load circulation path, and is always closed during load drive.

Closing the switch Sw2 during the rise of the current with respect to the load L1 allows the high voltage of the capacitor C1 to be applied to the load L1. When normal drive is performed, only the switch Sw1 is closed, the power source voltage E is applied directly to the load L1, and the current is increased.

If at this time the switch Sw3 is opened and closed in synchronization with the switch Sw1 and the switch Sw2, there is no need for the diode D2, but in actual practice there is a certain amount of discrepancy in the synchronization, and if any kind of overlap is produced, there will be a short circuit between the GND and the power source from the switch Sw3 through the switch Sw1 or the switch Sw2, so the diode D2 is provided for the safety.

Let us now consider a case in which the current I of the load L1 is reduced. When the switch Sw3 is closed and the switches Sw1 and Sw2 are opened, the current circulates through the switch Sw3, and the energy stored in the inductive load L1 is consumed by being converted into heat by the resistance inside the circulating path, etc. Here, if the switch Sw3 is also opened, the energy stored in the inductive load L1 will charge the regenerative pumping capacitor C2. Proper selection of the capacitance of the capacitor C2 allows the rate of increase of the terminal voltage of the capacitor C2 per unit of time to be selected. This is combined with the required rate of decrease in the load current I to select a capacitance, which allows the capacitor C2 to be quickly charged to over the power source voltage, and the energy stored in the inductive load L1 is also absorbed. When the terminal voltage of the capacitor C2 is over the power source voltage, reclosing the switch Sw3 allows the energy stored in the capacitor C2 to be readily recovered in the power source E. Therefore, the opening and closing of the switch Sw3 results in the energy stored in the inductive load L1 being regenerated at the power source E.

Figure 12:
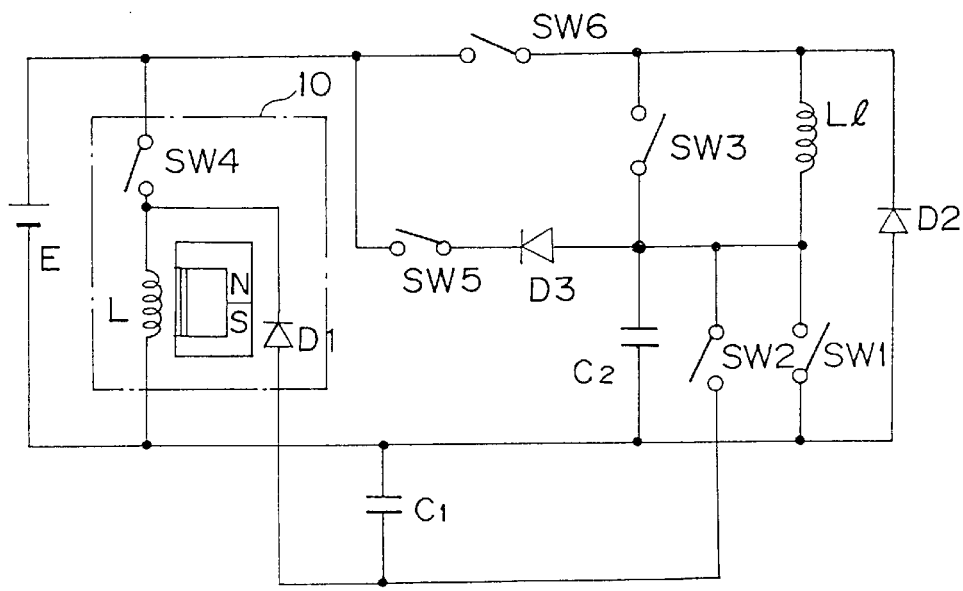
FIG. 12 is a circuit diagram of yet another practical example of the inductive load drive device of the present invention.

FIG. 12 shows yet another practical example of the inductive load drive device of the present invention, which is a circuit in which switches Sw5 and Sw6 and diodes D2 and D3 have been added to the circuit in FIG. 11.

The operation during current rise with respect to the inductive load L1 is the same as in the practical example shown in FIG. 11. When the rate of reduction in the load current I is to be increased, the energy stored in the inductive load L1 will be quickly charged into the regenerative pumping capacitor C2 when the switch Sw5 is opened, and the terminal voltage of the regenerative pumping capacitor C2 will quickly increase. Once the terminal voltage has exceeded the power source voltage, the energy stored in the regenerative pumping capacitor C2 will be regenerated at the power source when the switch Sw5 is closed, and the voltage of the regenerative pumping capacitor C2 will fall to the power source voltage. Thereafter, the load current I is also continuously regenerated at the power source through the diode D3.

As a result, control of the opening and closing of the switch Sw5 allows the energy stored in the inductive load L1 to be regenerated at the power source at a desired rate.

Figure 13:
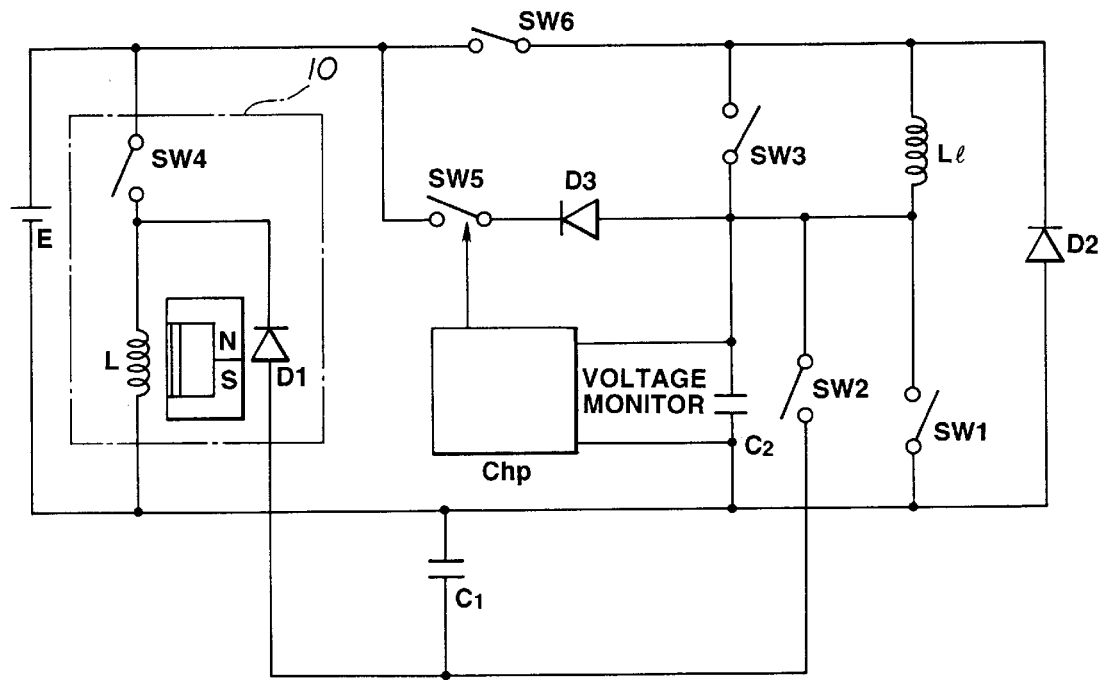
FIG. 13 is a circuit diagram of yet another practical example of the inductive load drive device of the present invention.

FIG. 13 shows yet another practical example of the inductive load drive device of the present invention. In this practical example, a circuit that monitors the terminal voltage of the regenerative pumping capacitor C2, compares this with a reference value, and controls the timing of the opening and closing of the switch Sw5 according to the comparison results is added to the circuit in FIG. 12.

When the terminal voltage of the regenerative pumping capacitor C2 is lower than the reference value, the switch control circuit Chp opens the switch Sw5 and charges the capacitor C2 with the load current I. When the terminal voltage of the capacitor C2 is higher than the reference voltage, the switch control circuit Chp closes the switch Sw5 and regenerates the energy stored in the capacitor C2 at the power source E. In this example, the opening and closing of the switch Sw5 is controlled automatically based on the terminal voltage of the capacitor C2.

Figure 14:
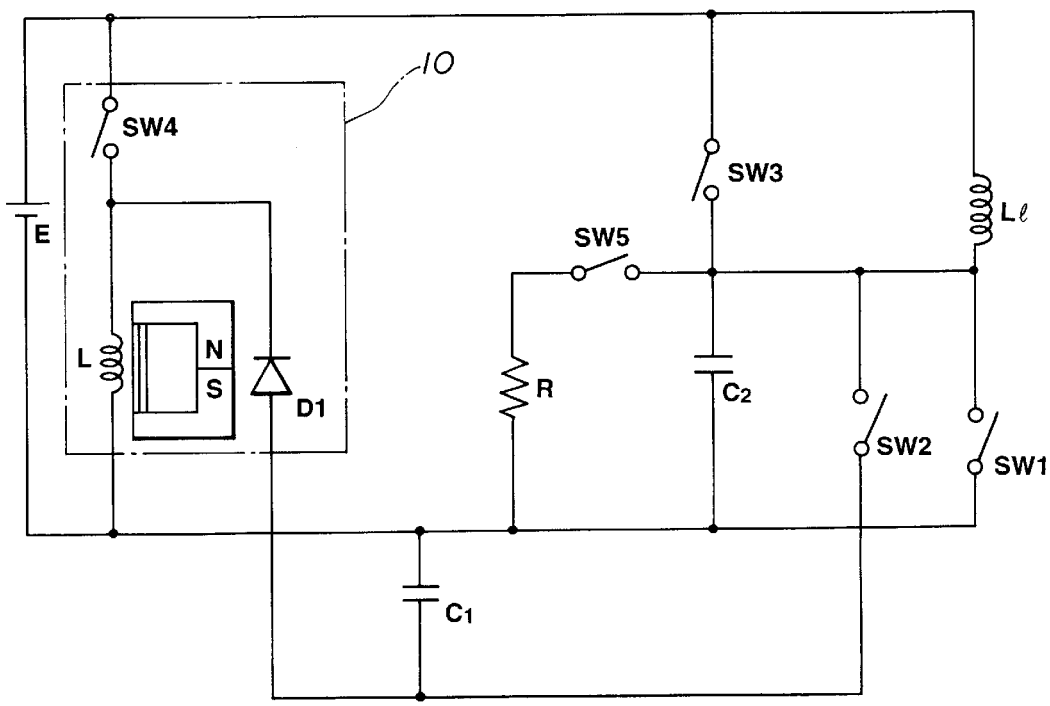
FIG. 14 is a circuit diagram of yet another practical example of the inductive load drive device of the present invention.
Figure 15:
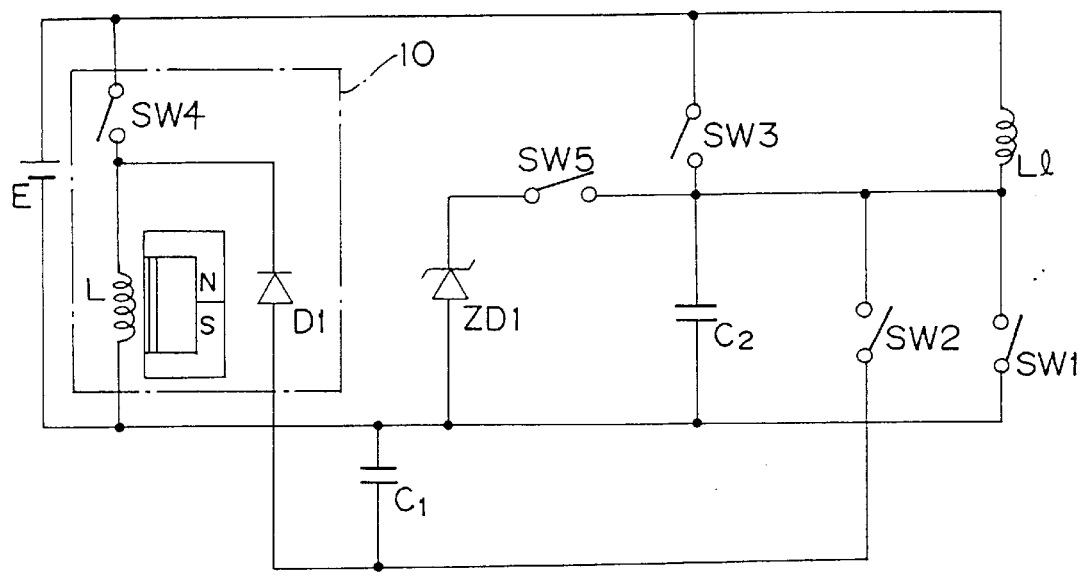
FIG. 15 is a circuit diagram of yet another practical example of the inductive load drive device of the present invention.

FIGS. 14 and 15 show still other practical examples of the inductive load drive device of the present invention. Instead of the energy stored in the regenerative pumping capacitor C2 being regenerated at the power source E, it is discharged by a discharging resistor R in FIG. 14, and is discharged by a voltage limiting element (such as a Zener diode or a ZNR) in FIG. 15.

Figure 16:
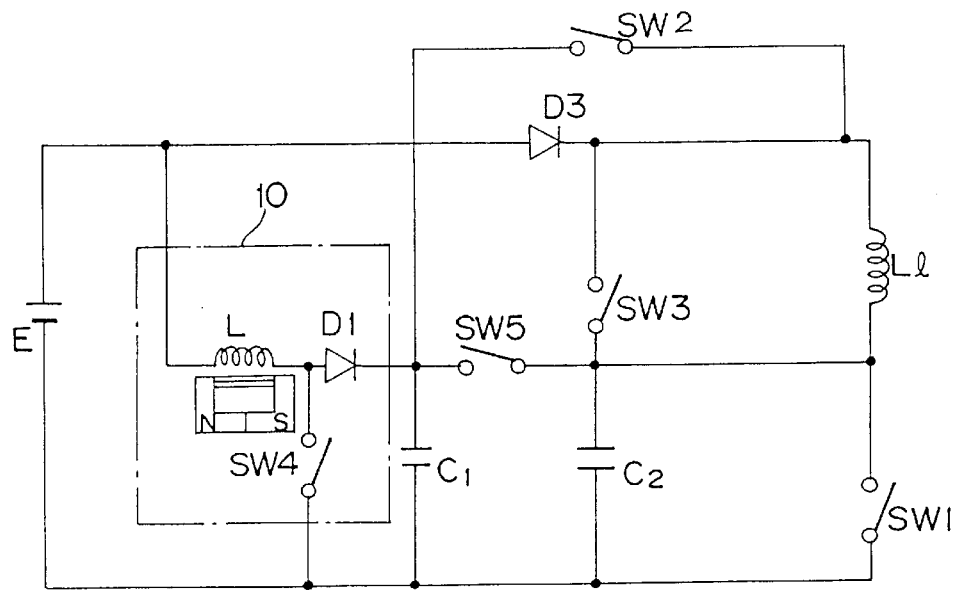
FIG. 16 is a circuit diagram of yet another practical example of the inductive load drive device of the present invention.

FIG. 16 shows yet another practical example of the inductive load drive device of the present invention.

In this practical example, instead of the energy stored in the regenerative pumping capacitor C2 being regenerated at the power source E, it is regenerated at a charging capacitor C1 of the charger circuit. When all of the switches Sw1 through Sw5 are opened, the regenerative pumping capacitor C2 is charged by the current flowing through the inductive load L1. When the charging voltage of this capacitor C2 is higher than the charging voltage of the charging capacitor C1 of the charger circuit, opening the switch Sw5 allows the energy stored in the capacitor C2 to be regenerated at the capacitor C1.

Thus regenerating the energy at the capacitor C1 rather than at the power source E allows the energy to be used without being wasted during the subsequent drive of the inductive load L1.

Figure 17:
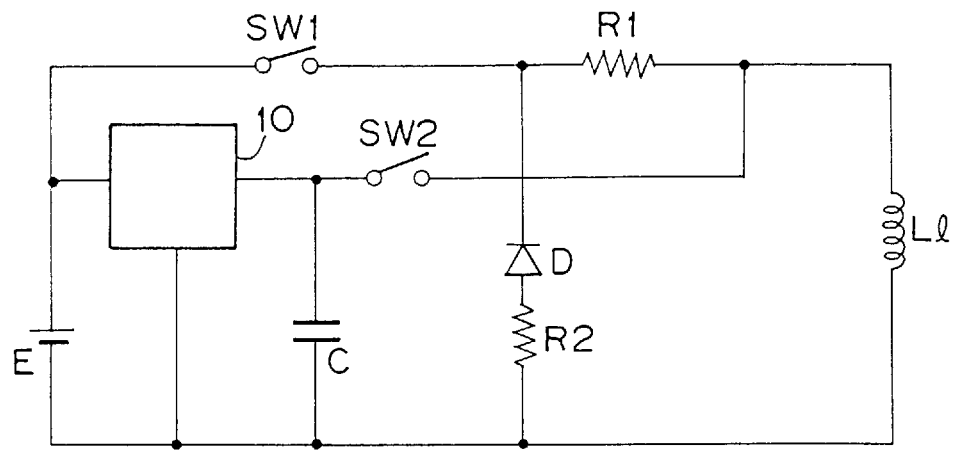
FIG. 17 is a circuit diagram of yet another practical example of the inductive load drive device of the present invention.

FIG. 17 shows yet another practical example of the inductive load drive device of the present invention.

In this practical example, the power source E is applied by the switch Sw1 to the inductive load L1 via a resistor R1 that serves as a first current control means, and the charging capacitor C of the charger circuit is connected directly to the inductive load L1 without going through a resistor or the like.

A resistor R2 is a second current control means that is positioned in the circulating path of the inductive load L1, and serves to absorb the energy stored in the inductive load L1 when the switches Sw1 and Sw2 are both opened.

Figure 18:
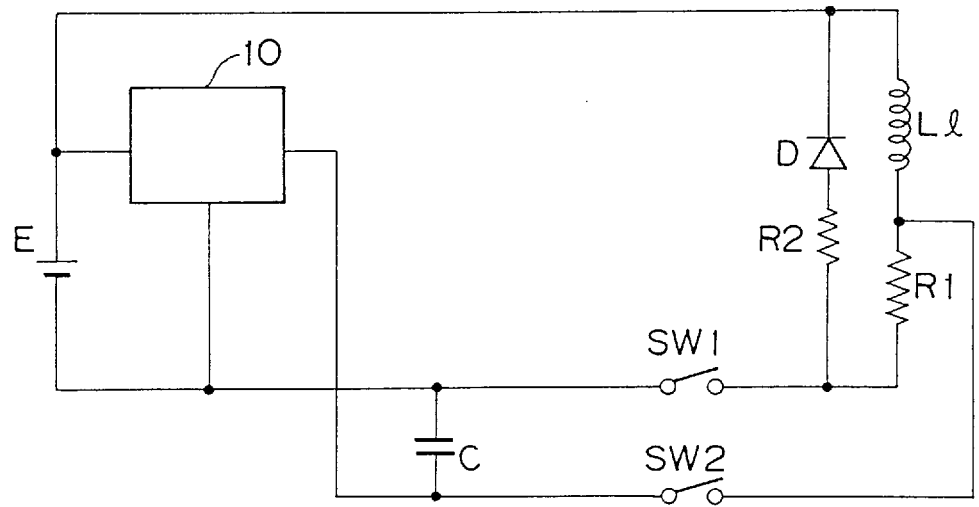
FIG. 18 is a circuit diagram of yet another practical example of the inductive load drive device of the present invention.

FIG. 18 shows yet another practical example of the inductive load drive device of the present invention.

As can be seen from FIGS. 17 and 18, with the series circuit in this practical example that works through the action of the switches Sw1 and Sw2, the overall circuit will function no matter where the various constituent elements are located on the circuit. In FIG. 18, the structure is such that the positive side of the charging capacitor C is grounded and negative voltage is charged.

Figure 19:
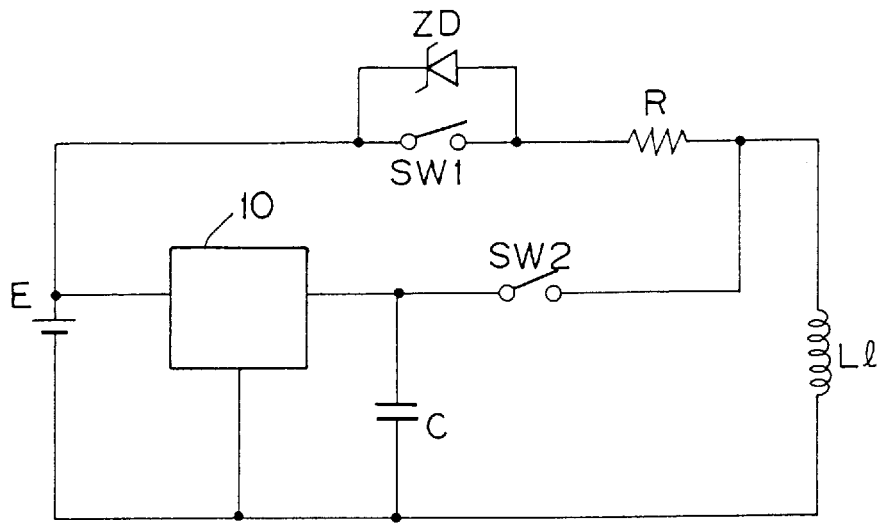
FIG. 19 is a circuit diagram of yet another practical example of the inductive load drive device of the present invention.

FIG. 19 shows yet another practical example of the inductive load drive device of the present invention.

In this practical example, the circulating path of the load current goes through the power source E when the switches Sw1 and Sw2 are both open, which means that an independent circulating path is omitted and the circuit is simplified.

Here, a voltage limiting element Zd is used as the current limiting element, and this voltage limiting element Zd is installed in parallel with the switch Sw1. Setting the limiting voltage value of this voltage limiting element Zd higher than the power source voltage allows the load current to be reduced all the way down to zero upon completion of the inductive load L1 circulation.

The voltage limiting element Zd may also be installed in parallel with the switch Sw2, but since this blocks the current from the charging capacitor C, the limiting voltage value has to be raised to a higher level, so efficiency suffers.

Figure 20:
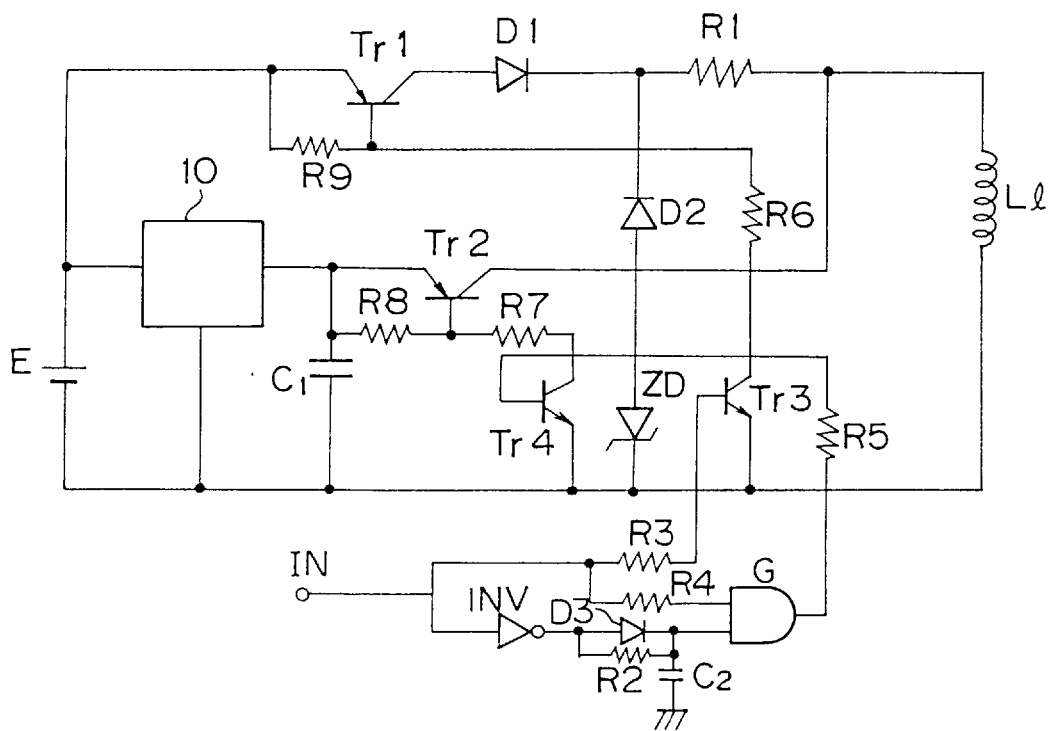
FIG. 20 is a circuit diagram of yet another practical example of the inductive load drive device of the present invention.

FIG. 20 is a practical example in which a junction type of transistor is employed as the switching means. A logic circuit is employed as the circuit that controls the switching means.

The circuit is actuated when a positive input signal is sent to the input IN, a high voltage application switch Tr2 is turned on for a specific time determined by the resistor R2 and the capacitor C2, and a power source E application switch Tr1 is turned on at the same time.

The diode D1 at this time prevents the high voltage on the load side from flowing back to the power source.

If the high voltage application switch Tr2 is opened after the specific time has elapsed, the load current will be reduced by the resistor R and will become a steady-state drive current.

Once the input IN reaches 0 V, the switches Tr1 and Tr2 are opened unconditionally, the load current circulates through the circulating path including the voltage limiting element Zd, and the energy is quickly absorbed and attenuated by the voltage limiting element Zd.

Figure 21:
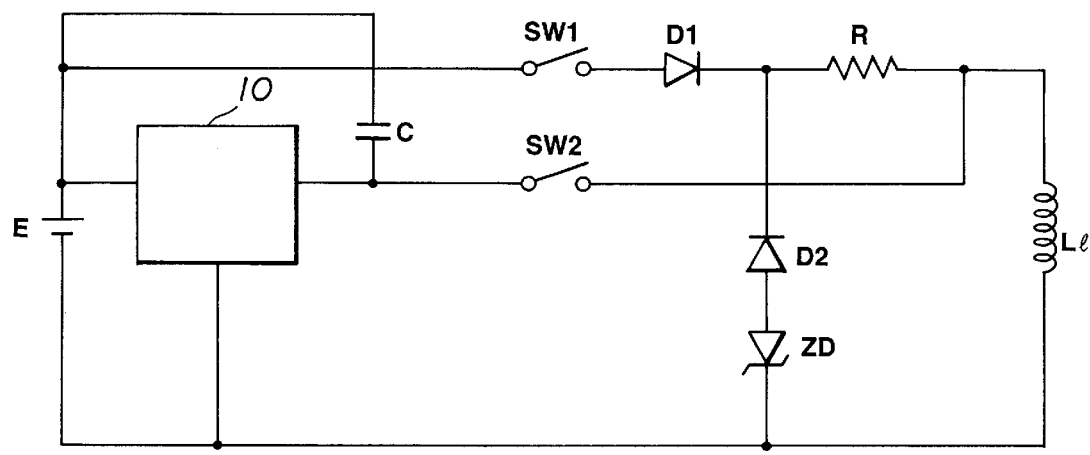
FIG. 21 is a circuit diagram of yet another practical example of the inductive load drive device of the present invention.
Figure 22:
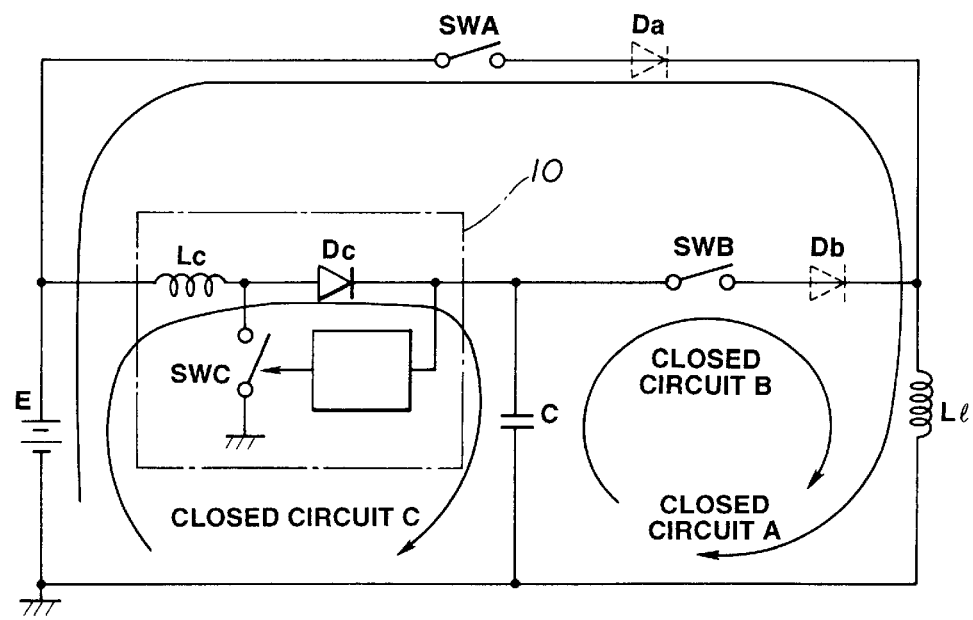
FIG. 22 is a circuit diagram of a conventional example of an inductive load drive device.

FIG. 21 is yet another practical example of the inductive load drive device of the present invention. The negative side of the charging capacitor C is connected to the positive side of the power source E, and the capacitor voltage is added to the power source voltage, so a higher voltage is obtained and efficiency improves.

As described above, with the present invention a bias is applied to the magnetic core of a coil through the use of a permanent magnet or an electromagnet, and a magnetized coil whose energy density per unit of surface area of the magnetic core has been increased is used to charge a capacitor with a DC—DC converter that makes up the charger circuit of an inductive load drive device, so the coil can be made more compact and lightweight in order to obtain the same energy. Also, if a coil of the same size is used, more energy can be obtained with a single switching. Therefore, the charger circuit can be made more compact, lightweight, and efficient, and the inductive load drive device itself can in turn be made more compact, lightweight, and efficient.

INDUSTRIAL APPLICABILITY

With the present invention, a bias is applied to the magnetic core of a coil through the use of a permanent magnet or an electromagnet, the energy density per unit of surface area of the magnetic core is increased, and the DC—DC converter that makes up the charger circuit of an inductive load drive device is made more compact and lightweight. Such an inductive load drive device is effective for the drive of large on-board motors in cranes and the like, as well as for the drive of all inductive loads.

We claim:

1. A DC—DC converter circuit provided with a power source, a coil that is connected to the power source, switching means for opening and closing a closed circuit including the power source and the coil, a capacitor that is connected in parallel to the switching means and a diode provided between the coil and the switch means in such a manner as to prevent a current to flow through the switch means from the capacitor when the switch means is closed, wherein the switching means is closed so that a power source voltage will be applied to the coil, which results in energy being stored in the coil, and the switching means is opened at an arbitrarily determined timing, which results in the energy stored in the coil being stored in the capacitor and output through the diode, characterized in that:

an electromagnetic energy stored in the coil is increased by the application of a magnetic bias to a magnetic core of the coil in a direction opposite to a direction of a magnetic flux induced by a current supplied from the power source.

2. A DC—DC converter circuit as defined in claim 1, wherein the magnetic core includes a permanent magnet, and the magnetic core is magnetically biased by the permanent magnet in the direction opposite to the direction of the magnetic flux induced by the current supplied from the power source.

3. A DC—DC converter circuit as defined in claim 1, wherein the magnetic core has a bias-use winding, and the magnetic core is magnetically biased in the direction opposite to the direction of the magnetic flux induced by the current supplied from the power source by the supply of a constant current from a constant current source to the bias-use winding.

4. A DC—DC converter circuit provided with a power source, a first coil connected to the power source, switching means for opening and closing a closed circuit including the power source and the first coil, a second coil whose magnetic core being commonly used by the first coil, a capacitor connected in parallel to the second coil and a diode provided between the second coil and the capacitor in such a manner as to prevent a current to flow into the second coil when the switch means is closed, wherein the switching means is closed so that the current will flow to the first coil and the magnetic core of the first coil will be magnetized, and when the switching means is opened, the current induced in the second coil is stored in the capacitor and output through the diode, characterized in that:

the electromagnetic energy stored in the first coil is increased by the application of a magnetic bias to the magnetic core in a direction opposite to a direction of a magnetic flux induced by the current supplied from the power source.

5. A DC—DC converter circuit as defined in claim 4, wherein the magnetic core includes a permanent magnet, and the magnetic core is magnetically biased by the permanent magnet in the direction opposite to the direction of the magnetic flux induced by the current supplied from the power source.

6. A DC—DC converter circuit as defined in claim 4, wherein the magnetic core has a bias-use winding, and the magnetic core is magnetically biased in the direction opposite to the direction of the magnetic flux induced by the current supplied from the power source by the supply of a constant current from a constant current source to the bias-use winding.

7. A DC—DC converter circuit provided with a power source, a coil connected to the power source, switching means for opening and closing a closed circuit including the power source and all or part of windings of the coil, a capacitor connected in parallel to all or part of the windings of the coil and a diode provided between the capacitor and all or part of the windings of the coil in such a manner as to prevent a current to flow into a circuit including the capacitor and all or part of the windings of the coil when the switching means is closed, wherein the switching means is closed so that current will flow to all or part of the windings of the coil and a magnetic core of the coil will be magnetized, and when the switching means is opened, a current induced in all or part of the windings of the coil is stored in the capacitor and output, characterized in that:

an electromagnetic energy stored in the coil is increased by the application of a magnetic bias to the magnetic core in a direction opposite to a direction of a magnetic flux induced by the current supplied from the power source.

8. A DC—DC converter circuit as defined in claim 7, wherein the magnetic core includes a permanent magnet, and the magnetic core is magnetically biased by the permanent magnet in the direction opposite to the direction of the magnetic flux induced by the current supplied from the power source.

9. A DC—DC converter circuit as defined in claim 7, wherein the magnetic core has a bias-use winding, and the magnetic core is magnetically biased in the direction opposite to the direction of the magnetic flux induced by the current supplied from the power source by the supply of a constant current from a constant current source to the bias-use winding.

10. An inductive load drive device, characterized by:

a DC—DC converter having a coil in which a magnetic core has been magnetically biased in a direction opposite to a direction of a magnetic flux induced by a current supplied from a power source and having first switch means for opening and closing a closed circuit comprised of the power source and the coil, for storing energy which is stored in the coil when the first switch means is closed into a charging capacitor when the first switch means is opened and outputting the energy;

second switching means for supplying a charge of the charging capacitor or a power source voltage to an inductive load;

a diode for preventing the charge of the charging capacitor from being connected to the power source while a terminal voltage of the charging capacitor is higher than the power source voltage;

first control means for controlling opening and closing of the second switching means;

current detection means for controlling a value of the current flowing through the inductive load; and current control means.

11. An inductive load drive device as defined in claim 10, wherein there is provided a circuit that returns the current energy flowing through the inductive load to the charging capacitor or the power source.

12. An inductive load drive device as defined in claim 11, wherein the circuit that returns the current energy flowing through the inductive load to the charging capacitor or the power source is provided with a first circulating path through which the load current circulates while the inductive load is not being driven, and third switching means positioned in series with the first circulating path, and wherein a second circulating path is formed which includes a regenerative pumping capacitor used to pass the current that flows when the third switching means is opened, and the charge stored in the regenerative pumping capacitor is discharged in the direction that the power source or the charging capacitor is charged.

13. An inductive load drive device as defined in claim 12, wherein the circulation of the load current to the second circulating path including the regenerative pumping capacitor is halted when a charge over the power source voltage is stored in the regenerative pumping capacitor, a third circulating path is formed in the direction that the load current directly charges the power source, fourth switching means is provided in series with the new circulating path, the load current charges the regenerative pumping capacitor to over the power source voltage when the fourth switching means is opened, and the fourth switching means is reclosed, which results in the charge stored in the regenerative pumping capacitor being discharged in the direction that the power source is charged.

14. An inductive load drive device as defined in claim 13, wherein the device comprises comparison means which receives the terminal voltage of the regenerative pumping capacitor and compares it with a specific voltage, and second control means for controlling the opening and closing of the fourth switching means in order to discharge the charge stored in the regenerative pumping capacitor to the power source or the charging capacitor when the caparison means detects that the terminal voltage of the regenerative pumping capacitor has exceeded a specific first value, and for controlling the opening and closing of the fourth switching meats so that the load current charges the regenerative pumping capacitor when the terminal voltage of the regenerative pumping capacitor has dropped below the specific value.

15. An inductive load drive device as defined in claims 12, 13 or 14, wherein the charge stored in the regenerative pumping capacitor is discharged to a discharging resistor instead of charging the power source.

16. An inductive load drive device as defined in claims 12, 19 or 20, wherein the charge stored in the regenerative pumping capacitor is discharged to a voltage control element instead of charging the power source.

17. An inductive load drive device as defined in claims 12, 19 or 20, wherein the charge stored in the regenerative pumping capacitor is made to charge a capacitor other than the regenerative pumping capacitor or the charging capacitor instead of charging the power source.

18. An inductive load drive device, characterized by:

a DC—DC converter circuit having a coil in which a magnetic core has been magnetically biased in a direction opposite to a direction of a magnetic flux induced by a current supplied from a power source, and in which an energy stored in the coil is stored in a charging capacitor and output;

first switching means for applying the power source to an inductive load;

first current limiting means arranged in series with a closed circuit including the inductive load, the closed circuit being formed when the first switching means is closed;

second switching means for connecting the charging capacitor to the inductive load without going through the first current limiting means;

a circulating path including a diode through which a load current can circulate when the first and second switching means are opened; and second current limiting means arranged in series with the circulating path.

19. An inductive load drive device, comprising:

a DC—DC converter circuit having a coil in which a magnetic core has been magnetically biased in a direction opposite to a direction of a magnetic flux induced by a current supplied from a power source, and in which an energy stored in the coil is stored in a charging capacitor and output;

first switching means for applying the power source to an inductive load;

first current limiting means arranged in series with a closed circuit including the inductive load, the closed circuit being formed when the first switching means is closed;

second switching means for connecting the charging capacitor to the inductive load without going through the first current limiting means;

a circulating path including a diode through which a load current can circulate when the first and second switching means are opened;

second current limiting means arranged in series with the circulating path; and a controller for opening and closing the first and second switching means at a specific timing, characterized in that the controller closes the second switching means for a specified period at making according to an on/off signal input from outside, connects the charging capacitor to the inductive load, then closes the first switching means and simultaneously opens the second switching means, and opens both the first and second switching means even while still within the specified period if the on/off signal from the outside is turned off.

20. An inductive load drive device, comprising:

a DC—DC converter circuit having a coil in which a magnetic core has been magnetically biased in a direction opposite to a direction of a magnetic flux induced by a current supplied from a power source, and in which an energy stored in the coil is stored in a charging capacitor and output;

first switching means for applying the power source to an inductive load;

first current limiting means arranged in series with a closed circuit including the inductive load, the closed circuit being formed when the first switching means is closed;

second switching means for connecting the charging capacitor to the inductive load without going through the first current limiting means;

a circulating path including a diode through which a load current can circulate when the first and second switching means are opened;

second current limiting means arranged in series with the circulating path; and a controller for opening and closing the first and second switching means at a specific timing, characterized in that the controller closes both the first and second switching means for a specified period at making according to an on/off signal input from outside, connects the charging capacitor to the inductive load, then opens the second switching means, and opens both the first and second switching means even while still within the specified period if the on/off signal from the outside is turned off.

21. An inductive load drive device as defined in claims 18, 19 or 20, wherein at least one of the first and second switching means is a semiconductor switch.

22. An inductive load drive device, characterized by:

a DC—DC converter circuit having a coil in which a magnetic core has been magnetically biased in a direction opposite to a direction of a magnetic flux induced by a current supplied from a power source, and in which an energy stored in the coil is stored in a charging capacitor and output;

first switching means for applying the power source to an inductive load;

first current limiting means arranged in series with a closed circuit including the inductive load, the closed circuit being formed when the first switching means is closed; and second switching means for connecting the charging capacitor to the inductive load without going through the first current limiting means.

23. An inductive load drive device as defined in claim 22 further including a bias path that biases the first switching means when the first switching means is opened, and a second current limiting means positioned in the bias path.

24. An inductive load drive device as defined in claims 22 wherein the first switching means exhibits a current limiting effect by means of a finite off voltage when the first switching means is open.

25. An inductive load drive device, comprising:

a DC—DC converter circuit having a coil in which a magnetic core has been magnetically biased in a direction opposite to a direction of a magnetic flux induced by a current supplied from a power source, and in which an energy stored in the coil is stored in a charging capacitor and output;

first switching means for applying the power source to an inductive load;

first current limiting means arranged in series with a closed circuit including the inductive load, the closed circuit being formed when the first switching means is closed;

second switching means for connecting the charging capacitor to the inductive load without going through the first current limiting means; and a controller for opening and closing the first and second switching means at a specific timing, characterized in that the controller closes the second switching means for a specified period at making according to an on/off signal input from outside, connects the charging capacitor to the inductive load, then closes the first switching means and simultaneously opens the second switching means, and opens both the first and second switching means even while still within the specified period if the on/off signal from the outside is turned off.

26. An inductive load drive device as defined in claim 25 further including a bias path that biases the first switching means when the first switching means is opened, and a second current limiting means positioned in the bias path.

27. An inductive load drive device as defined in claims 25 wherein the first switching means exhibits a current limiting effect by means of a finite off voltage when the first switching means is open.

28. An inductive load drive device, comprising:

a DC—DC converter circuit having a coil in which a magnetic core has been magnetically biased in a direction opposite to a direction of a magnetic flux induced by a current supplied from a power source, and in which an energy stored in the coil is stored in a charging capacitor and output;

first switching means for applying the power source to an inductive load;

first current limiting means arranged in series with a closed circuit including the inductive load, the closed circuit being formed when the first switching means is closed;

second switching means for connecting the charging capacitor to the inductive load without going through the first current limiting means; and a controller for opening and closing the first and second switching means at a specific timing;

characterized in that the controller closes both the first and second switching means for a specified period at making according to an on/off signal input from outside, connects and the charging capacitor to the inductive load, then opens the second switching means, and opens both the first and second switching means even while still within the specified period if the on/off signal from the outside is turned off.

29. An inductive load drive device as defined in claim 28 further including a bias path that biases the first switching means when the first switching means is opened, and a second current limiting means positioned in the bias path.

30. An inductive load drive device as defined in claims 28 wherein the first switching means exhibits a current limiting effect by means of a finite off voltage when the first switching means is open.

* * * * *